(12) United States Patent
Schur et al.

(10) Patent No.: US 12,499,624 B2
(45) Date of Patent: Dec. 16, 2025

(54) MESH OPTIMIZATION USING NOVEL SEGMENTATION

(71) Applicant: Tencent America LLC, Palo Alto, CA (US)

(72) Inventors: Ethan Schur, San Jose, CA (US); Xiaozhong Xu, State College, PA (US); Shan Liu, San Jose, CA (US); Xiang Zhang, Sunnyvale, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 275 days.

(21) Appl. No.: 18/315,125

(22) Filed: May 10, 2023

(65) Prior Publication Data

US 2024/0062470 A1 Feb. 22, 2024

Related U.S. Application Data

(60) Provisional application No. 63/398,672, filed on Aug. 17, 2022.

(51) Int. Cl.
*G06T 17/20* (2006.01)
*G06T 7/11* (2017.01)

(52) U.S. Cl.
CPC ............ *G06T 17/205* (2013.01); *G06T 7/11* (2017.01); *G06T 2207/20084* (2013.01)

(58) Field of Classification Search
CPC ....... G06T 17/00; G06T 17/20; G06T 17/205; G06T 9/00; G06T 9/001; G06T 15/00; G06T 15/20; G06T 2207/20084; G06T 7/00; G06T 7/10; G06T 7/11; G06T 2207/20112; G06N 3/02; G06N 3/0464
See application file for complete search history.

(56) References Cited

U.S. PATENT DOCUMENTS

| | | | |
|---|---|---|---|
| 10,593,066 | B1 | 3/2020 | Dhua et al. |
| 2008/0246759 | A1 | 10/2008 | Summers |
| 2014/0362086 | A1 | 12/2014 | Brockmann et al. |
| 2020/0372710 | A1 | 11/2020 | Wang et al. |
| 2021/0256735 | A1* | 8/2021 | Tourapis ............ H03M 7/6005 |

(Continued)

FOREIGN PATENT DOCUMENTS

EP 3481067 A1 5/2019

OTHER PUBLICATIONS

International Search Report of the International Searching Authority dated Aug. 21, 2023 in Application No. PCT/US23/23468.

(Continued)

*Primary Examiner* — Kee M Tung
*Assistant Examiner* — Thang Gia Huynh
(74) *Attorney, Agent, or Firm* — Sughrue Mion, PLLC

(57) ABSTRACT

A method and apparatus that renders a mesh from one or more virtual camera views of an object, the one or more virtual camera views being projections of the mesh onto a plurality of 2D planes; inputs the one or more virtual camera views into a fully-convolutional model for real-time segmentation; generates one or more 2D pixel-wise masks based on the fully-convolutional model, the 2D pixel-wise masks being associated with one or more segmented elements; performs remeshing and mesh optimization using the one or more 2D pixel-wise masks; and generates an output mesh based on the remeshing and mesh optimization.

18 Claims, 7 Drawing Sheets

(56) References Cited

U.S. PATENT DOCUMENTS

2022/0019852 A1\* 1/2022 Eyjolfsdottir ......... G06T 17/205
2022/0157014 A1\* 5/2022 Sevastopolskiy ...... G06V 10/82

OTHER PUBLICATIONS

Written Opinion of the International Searching Authority dated Aug. 21, 2023 in Application No. PCT/US23/23468.
EP Search Report issued Oct. 21, 2025 in EP Application No. 23855280.6.

\* cited by examiner

MESH OPTIMIZATION USING NOVEL SEGMENTATION

CROSS-REFERENCE TO RELATED APPLICATION

This application claims priority from U.S. Provisional Application No. 63/398,672, filed on Aug. 17, 2022, the disclosure of which is incorporated herein by reference in its entirety.

TECHNICAL FIELD

This disclosure is directed to mesh and video-based mesh compression technologies. More specifically, a system for achieving high quality volumetric segmentation masks and a method for mesh optimization and remeshing are disclosed.

BACKGROUND

The advances in 3D capture, modeling, and rendering have promoted the ubiquitous presence of 3D contents across several platforms and devices. Nowadays, it is possible to capture a baby's first step in one continent and allow the grandparents to see (and maybe interact) and enjoy a full immersive experience with the child in another continent. Nevertheless, in order to achieve such realism, models are becoming ever more sophisticated, and a significant amount of data is linked to the creation and consumption of those models. 3D meshes are widely used to represent such immersive contents.

A dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. Uncompressed or raw mesh and texture data of dynamic human subjects and objects may result in file sizes that are prohibitively large. Current mesh optimization techniques overly rely on manual processing, preventing real-time capture to transmission pipelines.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

The present disclosure provides a system for achieving high quality volumetric segmentation masks and a method for mesh optimization and remeshing.

According to some embodiments, there is provided a method performed by at least one processor that may include rendering a mesh from one or more virtual camera views of an object, the one or more virtual camera views being projections of the mesh onto a plurality of 2D planes. The method may further include inputting the virtual camera views into a fully-convolutional model for real-time segmentation. The method may further include generating one or more 2D pixel-wise masks based on the fully-convolutional model, the 2D pixel-wise masks being associated with one or more segmented elements. The method may further include performing remeshing and mesh optimization using the one or more 2D pixel-wise masks. The method may further include generating an output mesh based on the remeshing and mesh optimization.

According to other aspects of one or more embodiments, there is also provided an apparatus and non-transitory computer readable medium consistent with the method.

Additional embodiments will be set forth in the description that follows and, in part, will be apparent from the description, and/or may be learned by practice of the presented embodiments of the disclosure.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

The following detailed description of example embodiments refers to the accompanying drawings. The same reference numbers in different drawings may identify the same or similar elements.

In this disclosure, a number of methods are proposed to achieving high quality volumetric segmentation masks and mesh optimization and remeshing. Those methods may be applied individually or by any form of combinations. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Figure 1:
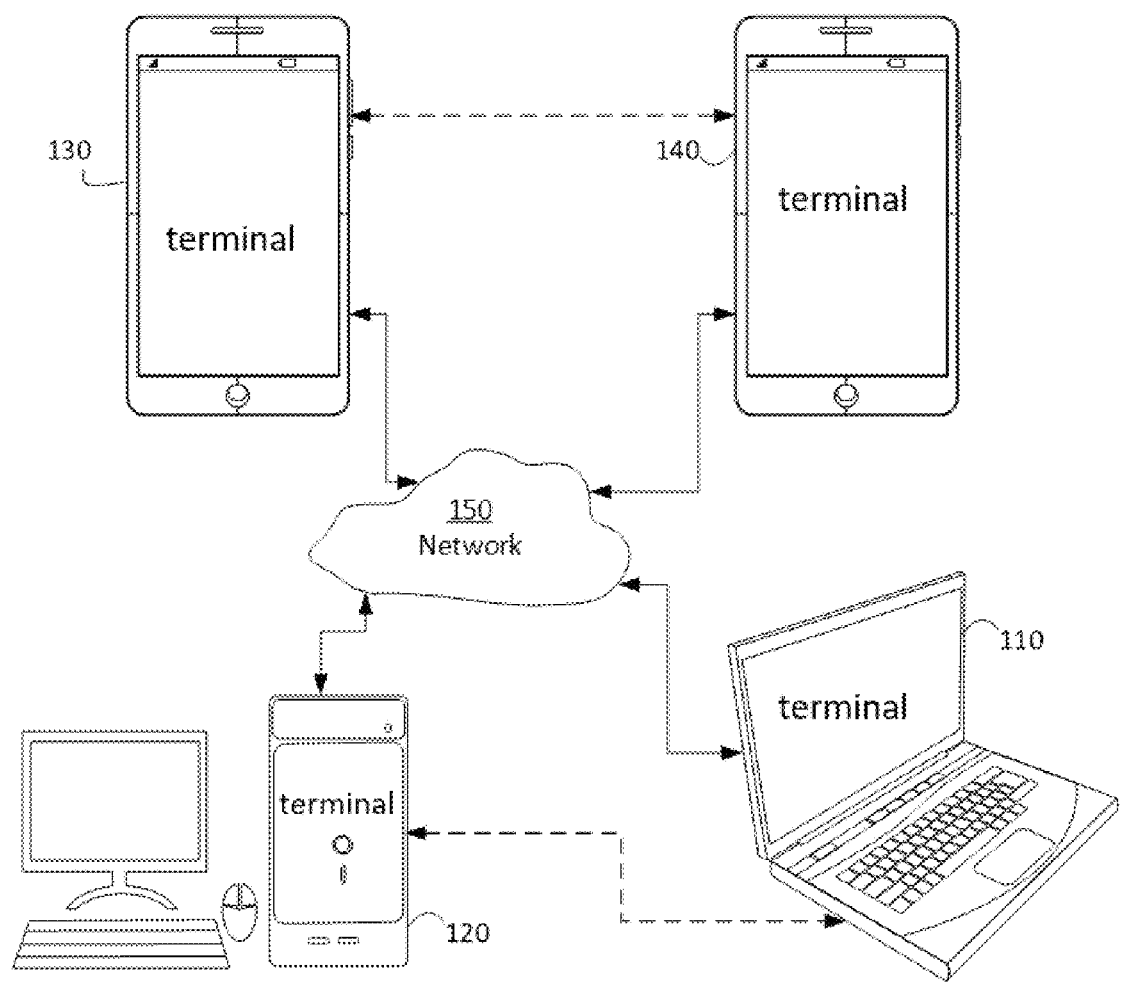
FIG. 1 is a schematic illustration of a simplified block diagram of a communication system, according to some embodiments.
Figure 2:
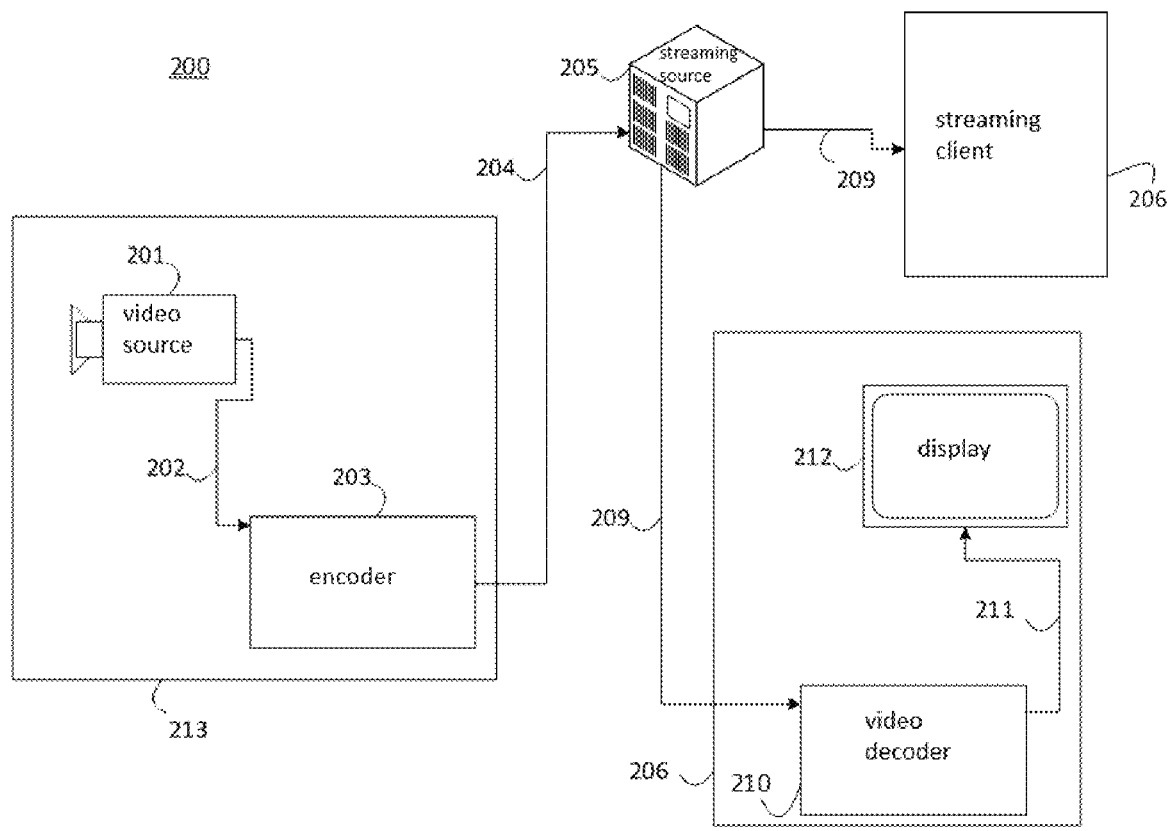
FIG. 2 is a schematic illustration of a simplified block diagram of a streaming system, according to some embodiments.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be used in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 can, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

A mesh generally refers to several polygons that describe the surface of a volumetric object. Its vertices in 3D space and the information of how the vertices are connected may define each polygon, referred to as connectivity information. Optionally, vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. Such information may be used for various purposes such as texture mapping, shading, and mesh reconstruction.

In some embodiments, a mesh may be rendered from one or more virtual camera views, and the views may be regarded as the projections of the 3D mesh data onto 2D planes. Rendering may refer to the processing performed on the 2D data to make it appear solid and three-dimensional. These views are fed into a fully-convolutional model or other systems for real-time segmentation. The resultant 2D pixel-wise masks associated with the segmented elements may then be used as additional inputs for enhanced downstream remeshing and mesh optimization. The remeshing process may include removing duplicate polygons when rendering a new mesh. Mesh optimization may refer to the process of lowering the bandwidth required to render a mesh.

A pixel-wise mask generally refers to a semantic and segmented pixel grouping that assigns per-pixel correlation of objects in a 2D frame. For example, if a scene has four penguins, each penguin is assigned a pixel wise mask that describes every pixel. In this case there would be four instance segmented pixel-wise masks for penguins 1 through 4.

Figure 3:
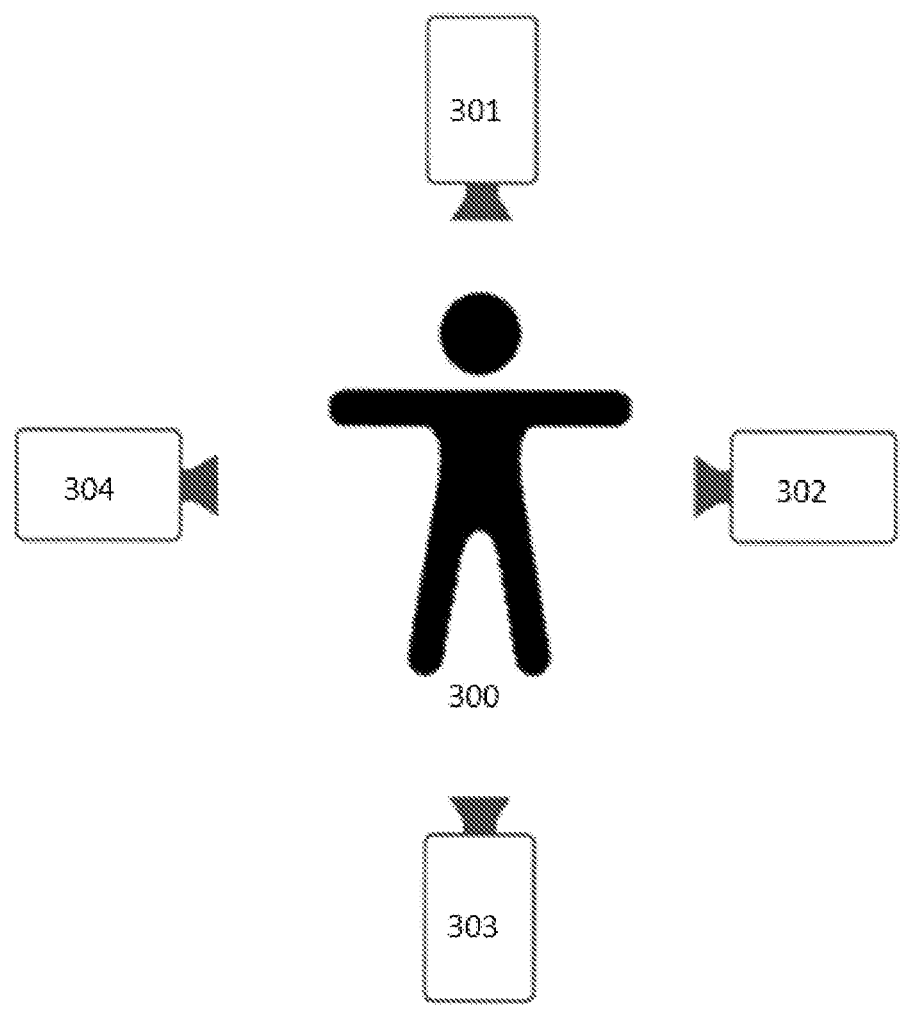
FIG. 3 is an illustration of a plurality of virtual cameras used to infer pixel-wise masks, according to some embodiments.

Pixel-wise masks may be assumed to also carry associated metadata correlating the virtual cameras used to render the scene to the mask. For example the camera pose, field-of-view, virtual sensor size, resolution, aspect ratio, etc. As seen in FIG. 3, a plurality of virtual cameras 301-304 may be set to render a multitude of views used to infer the pixel-wise masks of object 300.

Figure 4:
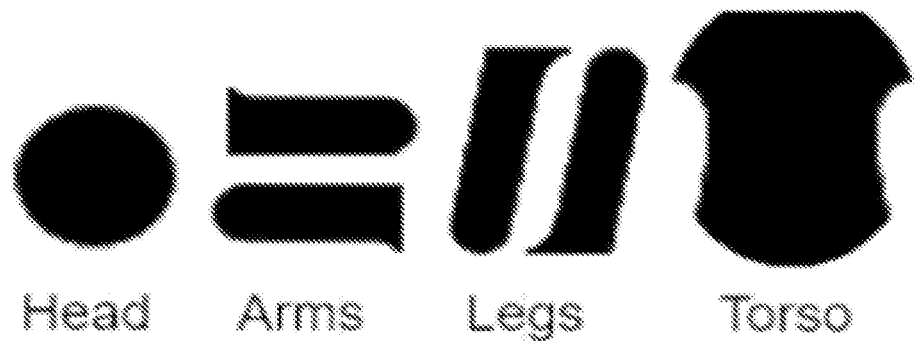
FIG. 4 is an example of instance segmentation, according to some embodiments.

FIG. 4 provides an example of a plurality of pixel wise masks rendered by the virtual cameras, according to some embodiments. The plurality of pixel-wise masks and their associated metadata may be used to generate an output mesh that is enhanced in multiple ways. These enhancements may include, and are not limited to:

Retaining detail of facial features and frequent objects of interest as well as known human visual saliency features Removing redundant vertices and points, remapping of index and vertex buffers.

Integrating with mesh shader pipeline for vertex reuse and culling.

Figure 5:
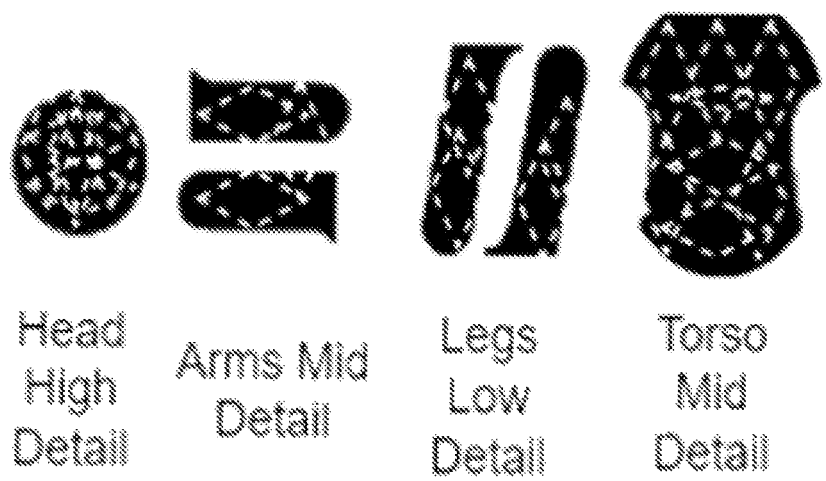
FIG. 5 is an example of optimized remeshed segments, according to some embodiments.

FIG. 5 provides an example of an optimized remeshing, according to some embodiments. The dashed lines represent the polygons that may comprise the pixel-wise masks. The remeshing process may include removing duplicate polygons and optimizing the mesh by lowering the bandwidth.

Figure 6:
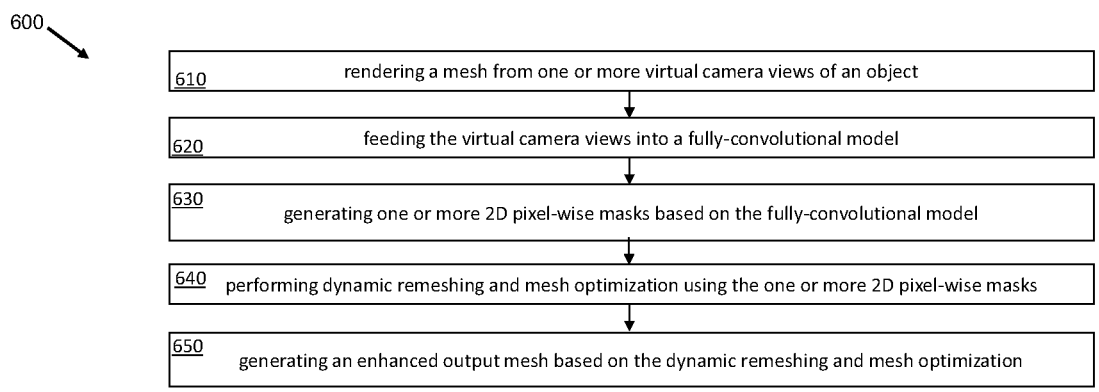
FIG. 6 is an operational flowchart illustrating the steps carried out by a program for mesh optimization and remeshing, according to some embodiments.

FIG. 6 is a flowchart of example process 600 for achieving high quality volumetric segmentation masks using mesh optimization and remeshing. In some embodiments, one or more process blocks of FIG. 6 may be performed by any of the elements discussed above.

As shown in FIG. 6, process 600 may include rendering a mesh from one or more virtual camera views of an object, the one or more virtual camera views being projections of the mesh onto a plurality of 2D planes (block 610).

As further shown in FIG. 6, the process 600 may include inputting the virtual camera views into a fully-convolutional model for real-time segmentation (block 620).

As further shown in FIG. 6, the process 600 may include generating one or more 2D pixel-wise masks based on the fully-convolutional model, the 2D pixel-wise masks being associated with one or more segmented elements (block 630).

As further shown in FIG. 6, the process 600 may include performing remeshing and mesh optimization using the one or more 2D pixel-wise masks (block 640).

As further shown in FIG. 6, the process 600 may include generating an output mesh based on the remeshing and mesh optimization (block 650).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The following are select embodiments of the proposed methods and systems:

In some embodiments, masks are created from multiple angles using a trained convolutional neural network.

In some embodiments, masks are created from multiple angles using non AI-based logic.

In some embodiments, separate masks can be generated to further segment facial elements, arms, legs etc., separately.

In some embodiments, the virtual camera pose and orientation are set based on knowledge of previously trained data such as 3D human portrait datasets.

In some embodiments, the pixel-wise masks are used as inputs to video based mesh compression system.

In some embodiments, the pixel-wise mask may be used to subdivide the mesh into multiple segments, and each segment may be packed into different geometry maps and then coded into different substreams.

In some embodiments, the pixel-wise mask may be used to decide the coding parameters for each segments. For example, the segments of the human face may use a smaller quantization parameter while being coded by a video codec.

In some embodiments, the pixel-wise masks may be used to perform remeshing operations. For example, in FIG. 5, different remeshing operations or different quantizations may be applied to different segments.

In some embodiments, the pixel wise masks may be used as inputs to a scene graph processor for the streaming of scene graph elements to a plurality of decoders, intermediary software, and renderers.

The techniques, described above, may be implemented as computer software using computer-readable instructions and physically stored in one or more computer-readable media. For example, FIG. 7 shows a computer system 900 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 7:
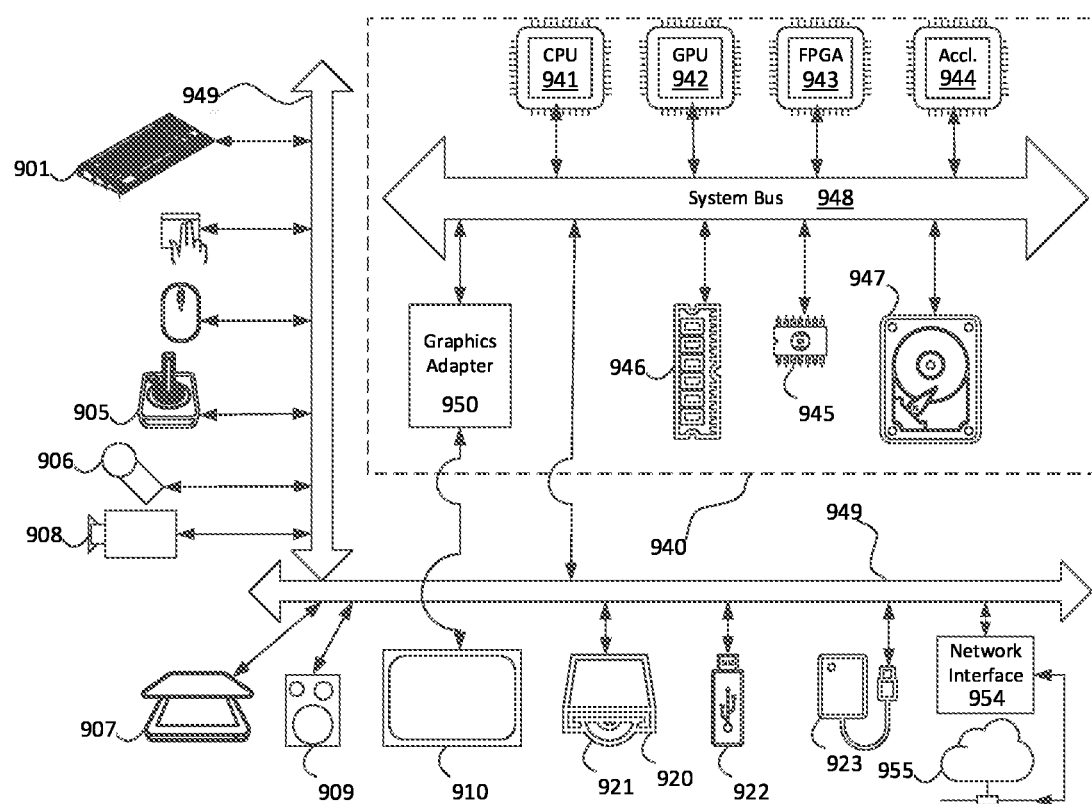
FIG. 7 is a diagram of a computer system suitable for implementing embodiments.

The components shown in FIG. 7 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there may also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 900 may also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 may also include interface to one or more communication networks. Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 955. Certain protocols and protocol stacks may be used on each of those networks and network interfaces as described above.

Aforementioned human interface devices, human-accessible storage devices, and network interfaces 954 may be attached to a core 940 of the computer system 900.

The core 940 may include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 may be accessible in the form of one or more physical plugs to enable extensions by additional CPUs, GPU, and the like. The peripheral devices may be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 may execute certain instructions that, in combination, may make up the aforementioned computer code. That computer code may be stored in ROM 945 or RAM 946. Transitional data may be also be stored in RAM 946, whereas permanent data may be stored for example, in the internal mass storage 947. Fast storage and retrieve to any of the memory devices may be enabled through the use of cache memory, that may be closely associated with one or more CPU 941, GPU 942, mass storage 947, ROM 945, RAM 946, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, a computer system having the architecture of computer system 900, and specifically the core 940 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 940 that are of non-transitory nature, such as core-internal mass storage 947 or ROM 945. The software implementing various embodiments of the present disclosure may be stored in such devices and executed by core 940. A computer-readable medium may include one or more memory devices or chips, according to particular needs. The software may cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system may provide functionality as a result of logic hardwired or otherwise embodied in a circuit (for example: accelerator 944), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor, the method comprising:
 rendering a mesh from one or more virtual camera views of an object, the one or more virtual camera views being projections of the mesh onto a plurality of two-dimensional (2D) planes;
 inputting the one or more virtual camera views into a fully-convolutional model for real-time segmentation;
 generating one or more 2D pixel-wise masks based on the fully-convolutional model, the 2D pixel-wise masks being associated with one or more segmented elements, the one or more 2D pixel-wise masks are used as inputs to a scene graph processor for streaming a plurality of scene graph elements to a plurality of decoders, intermediary software, and renderers;
 performing remeshing and mesh optimization using the one or more 2D pixel-wise masks; and
 generating an output mesh based on the remeshing and mesh optimization.

2. The method according to claim 1, wherein the one or more 2D pixel-wise masks are generated from multiple angles using a trained convolutional neural network.

3. The method according to claim 1, wherein the one or more 2D pixel-wise masks are generated from multiple angles using logic which is not based on artificial intelligence.

4. The method according to claim 1, further comprising generating one or more separate 2D pixel-wise masks to further segment one or more elements of the object.

5. The method according to claim 1, further comprising setting a virtual camera pose and an orientation based on knowledge of previously trained data.

6. The method according to claim 1, wherein the one or more 2D pixel-wise masks are used as inputs to a video based mesh compression system.

7. The method according to claim 1, further comprising:
subdividing the mesh into a plurality of segments using the one or more 2D pixel-wise masks.

8. The method according to claim 7, wherein the one or more 2D pixel-wise masks are used to determine one or more coding parameters for each of the plurality of segments.

9. An apparatus comprising:
at least one memory configured to store program code; and
at least one processor configured to read the program code and operate as instructed by the program code, the program code comprising:
rendering code configured to cause the at least one processor to render a mesh from one or more virtual camera views of an object, the one or more virtual camera views being projections of the mesh onto a plurality of two-dimensional (2D) planes;
inputting code configured to cause the at least one processor to input the one or more virtual camera views into a fully-convolutional model for real-time segmentation;
first generating code configured to cause the at least one processor to generate one or more 2D pixel-wise masks based on the fully-convolutional model, the 2D pixel-wise masks being associated with one or more segmented elements, the one or more 2D pixel-wise masks are used as inputs to a scene graph processor for streaming a plurality of scene graph elements to a plurality of decoders, intermediary software, and renderers;
remeshing code configured to cause the at least one processor to perform remeshing and mesh optimization using the one or more 2D pixel-wise masks; and
second generating code configured to cause the at least one processor to generate an output mesh based on the remeshing and mesh optimization.

10. The apparatus according to claim 9, wherein the one or more 2D pixel-wise masks are generated from multiple angles using a trained convolutional neural network.

11. The apparatus according to claim 9, wherein the one or more 2D pixel-wise masks are generated from multiple angles using logic which is not based on artificial intelligence.

12. The apparatus according to claim 9, wherein the program code further includes third generating code configured to cause the at least one processor to generate one or more separate 2D pixel-wise masks to further segment one or more elements of the object.

13. The apparatus according to claim 9, wherein the program code further includes setting code configured to cause the at least one processor to set a virtual camera pose and an orientation based on knowledge of previously trained data.

14. The apparatus according to claim 9, wherein the one or more 2D pixel-wise masks are used as inputs to a video based mesh compression system.

15. The apparatus according to claim 9, wherein the program code further includes:
subdividing code configured to cause the at least one processor to subdivide the mesh into a plurality of segments using the one or more 2D pixel-wise masks.

16. The apparatus according to claim 15, wherein the one or more 2D pixel-wise masks are used to determine one or more coding parameters for each of the plurality of segments.

17. A non-transitory computer-readable storage medium, storing instructions, which, when executed by at least one processor, cause the at least one processor to:
render a mesh from one or more virtual camera views of an object, the one or more virtual camera views being projections of the mesh onto a plurality of two-dimensional (2D) planes;
input the one or more virtual camera views into a fully-convolutional model for real-time segmentation;
generate one or more 2D pixel-wise masks based on the fully-convolutional model, the 2D pixel-wise masks being associated with one or more segmented elements, the one or more 2D pixel-wise masks are used as inputs to a scene graph processor for streaming a plurality of scene graph elements to a plurality of decoders, intermediary software, and renderers;
perform remeshing and mesh optimization using the one or more 2D pixel-wise masks; and
generate an output mesh based on the remeshing and mesh optimization.

18. The non-transitory computer-readable storage medium according to claim 17, wherein the one or more 2D pixel-wise masks are generated from multiple angles using a trained convolutional neural network.

* * * * *